United States Patent Office 2,926,160
Patented Feb. 23, 1960

2,926,160

THERMAL POLYMERIZATION OF ACRYLONITRILE OR METHACRYLONITRILE IN THE PRESENCE OF A BENZOXAZOLYL DISULFIDE CATALYST

Roland J. Kern, Dayton, Ohio, assignor to Monsanto Chemical Company, St. Louis, Mo., a corporation of Delaware No Drawing. Application October 27, 1953
Serial No. 388,685

7 Claims. (Cl. 260—88.7)

This invention relates to the thermal polymerization of acrylonitrile and methacrylonitrile. In specific aspects the invention pertains to the use of thermal initiators for the polymerization of acrylonitrile and methacrylonitrile.

An object of this invention is to effect the polymerization of a monomer selected from the group consisting of acrylonitrile and methacrylonitrile. Another object of the invention is to increase the rate of polymerization of these monomers when heated. A further object is to provide a new class of thermal polymerization initiators. Yet another object is to employ benzoxazolyl disulfide compounds as thermal initiators (catalysts) for the polymerization of acrylonitrile and methacrylonitrile. A still further object is to initiate the thermal polymerization of a monomeric material comprising acrylonitrile or methacrylonitrile with the aid of a benzoxazolyl disulfide. Further objects and advantages of the invention will be apparent to those skilled in the art from the accompanying disclosure and discussion.

In accordance with preferred embodiments of this invention, one or more of the monomers acrylonitrile and methacrylonitrile are polymerized by heating in the presence of small but catalytic amounts of benzoxazolyl disulfide or derivatives thereof containing one or more non-interfering groups attached to one or both of the aromatic nuclei. Preferred thermal initiators of the present invention can be represented by the structural formula:

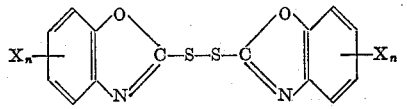

wherein $n$ in either instance is an integer from zero (0) to four (4) inclusive and X in either instance is a non-interfering group, i.e., a group which does not prevent the desired initiation of thermal polymerization of the monomers named. In any of the foregoing, X can be, for example, halogen, aryl, alkyl, cycloalkyl, aralkyl, alkaryl, alkoxy, or can include a chain of 4 carbon atoms attached at the ends to 2 adjacent carbon atoms of the aromatic nucleus, thereby forming a fused aromatic ring structure. An example of the latter type of compound is naphthoxazolyl disulfide. As specific examples of constituents representing X can be mentioned methyl, isobutyl, chloro, bromo, cyclohexyl, methylcyclopentyl, butoxy, naphthyl, benzyl, phenyl, tolyl, nitro, and the like. In the case of benzoxazolyl disulfide itself, i.e., 2,2'-bis-benzoxazolyl disulfide, both $n$'s are equal to zero (0). It is to be understood that in the benzoxazolyl disulfide compounds, one of the $n$'s in the structural formula can be one numeral and the other $n$ a different numeral, including zero (0), that either X can represent different non-interfering groups attached to the same aromatic nucleus, and that the two X's can represent the same or different groups. Preferred X's are those groups that are electron-releasing, e.g., alkyl, alkoxy, as in many instances they enhance the polymerization initiating effect of the parent compound. Although compounds containing on the aromatic ring electron-attracting groups, e.g., nitro, can be used, they are not preferred because such groups usually tend to reduce the polymerization initiating effect of the parent compound. See Hammett, Physical Organic Chemistry, McGraw-Hill, 1940, chapter VII, and especially Table I and page 196, and Jaffé, "A Re-Examination of the Hammett Equation," Chemical Reviews 53, 191–261 (1953), for a discussion of electron-releasing and electron-attracting groups, the substituent constant $\delta$ being negative for the former and positive for the latter. Organic substituents on the aromatic nucleus should preferably contain from 1 to 6 carbon atoms. Of course, where the aromatic nucleus is a condensed ring nucleus, e.g., naphtholyl, the term substituents used in the preceding sentence refers to substituents on any of the rings in the said condensed ring structure. It should be pointed out that X in the foregoing structural formula can be a hydrocarbon substituent which in itself can be further substituted by non-interfering groups, including hydrocarbon and non-hydrocarbon groups that are specifically mentioned hereinbefore as examples of X. The following specific compounds are mentioned by way of example: 2,2'-bis-benzoxazolyl disulfide, 2,2'-bis(6-ethoxybenzoxazolyl)disulfide, 2,2'-bis(4-methylbenzoxazolyl)disulfide, 2,2'-bis-(5-chlorobenzoxazolyl)disulfide, 2,2'-bis(6-nitrobenzoxazolyl)disulfide, 2,2'-bis-naphthoxazolyl disulfide, 2,2'-bis-(4-methyl-6-tert.-amylbenzoxazolyl)disulfide, 2-benzoxazolyl-2-(4-phenylbenzoxazolyl) disulfide, 2,2'-bis-[9-methoxynaphthoxazolyl] disulfide.

The action of benzoxazolyl disulfides towards thermal initiation of polymerization is very specific. Thus, they have no polymerizing activity whatever (in the absence of acrylonitrile or methacrylonitrile) toward vinyl acetate, styrene, and methyl methacrylate, and probably act somewhat to retard the thermal polymerization of the latter two compounds. Thus, the activity of the benzoxazolyl disulfide compounds described herein as thermal initiators (catalysts) for acrylonitrile and methacrylonitrile, is most surprising.

The invention is effected by heating a monomeric material consisting of either or both of the monomers discussed herein, or a monomeric material that is a mixture of either or both of the monomers discussed herein with one or more ethylenically unsaturated monomers copolymerizable therewith, in the presence of a small but catalytic amount of a benzoxazolyl disulfide compound effective to increase the rate of polymerization of the monomeric material. The material need only be heated to a temperature sufficient to obtain a desired polymerization rate, and this temperature is preferably in the neighborhood of 100° C., for example, 75° C. to 125° C. Ordinarily a temperature of above 50° C. is used to obtain useful polymerization rates. There is no particular upper limit on the polymerization temperature other than that dictated by the necessity of avoiding decomposition of monomer and/or polymer, keeping in mind that in general the higher the temperature the lower the molecular weight of the resulting polymer. Usually temperatures chosen will not exceed 150° C. to 175° C.

While the polymerization is often conducted in mass, i.e., in a system wherein the only active components of the reaction mixture are the monomer (or monomers)

plus the benzoxazolyl disulfide thermal initiator (together with other polymerization initiators and catalysts and regulators if desired) and no added reaction medium is present, the invention is more broadly applicable to all types of polymerization techniques. For example, an added organic solvent for monomer and/or polymer can be present, such as benzene, ethanol, acetone, ethylene dichloride. Further, the polymerization can be effected by the well-known suspension or emulsion techniques. In the former the monomeric material, preferably already containing the benzoxazolyl disulfide compound chosen as initiator, is suspended in the form of small particles in a non-solvent liquid, such as water, an added suspending agent such as starch, carboxymethylcellulose, phosphates, vinyl acetate-maleic anhydride copolymer, or the like being present to aid in maintaining the particles separate one from another; during the polymerization the particles may tend to grow in size. Emulsion polymerization is similar with the exception that added emulsifying agents are used and the particle size is much smaller so that a stable aqueous emulsion of polymer is the end product of the polymerization. In this instance also it is preferred to dissolve the benzoxazolyl disulfide initiator in the monomeric material prior to emulsifying the same. Suitable emulsifying agents are sodium or potassium fatty acid soaps, sodium alkaryl sulfonates, and non-ionic emulsifiers such as condensation products of ethylene oxide with tertiary alkyl mercaptans.

Often 0.01 weight percent of the thermal initiator, based on the weight of monomeric material present, is ample. Almost always, 0.1 weight percent will be sufficient to obtain a good polymerization rate when the polymerizing mixture is heated to a suitable temperature. More than this quantity is seldom if ever necessary although more, say up to 1 to 5 percent, can be used if desired.

The purity of monomer may have a marked effect on the polymerization rate. Changes occurring in the monomer during storage may prevent the catalytic effects desired so that freshly distilled monomer is preferred. Similarly, some benzoxazolyl disulfide compounds are more likely than others to be affected by monomer purity, particular monomer, and conditions of reaction. The invention encompasses the use of those benzoxazolyl disulfide compounds effective to increase the rate of thermal polymerization of acrylonitrile or methacrylonitrile with a suitable combination of reaction conditions including monomer purity and quantity of benzoxazolyl disulfide compound. It is usually preferred that the polymerization be effected in the absence of air. Those skilled in the art, having been given the benefit of the present disclosure, will recognize that the principles of the invention may be applicable to polymerization of monomers closely related to acrylonitrile and methacrylonitrile containing groups that do not interfere with the desired thermal polymerization.

The invention is applicable not only to the homopolymerization of acrylonitrile and the homopolymerization of methacrylonitrile, but also to interpolymerization of either with a different ethylenicaly unsaturated monomer copolymerizable therewith. Thus, acrylonitrile and methacrylonitrile can be copolymerized with each other. Either can be copolymerized with one or more comonomers. Examples of comonomers that under suitable conditions can be copolymerized with acrylonitrile and/or methacrylonitrile, with the aid of a benzoxazolyl disulfide compound as thermal initiator, are: isobutylene, vinyl acetate, styrene, vinyl chloride, methyl methacrylate, vinyltoluene, ethyl acrylate, butyl acrylate, vinylidene chloride, vinyl fluoride, vinylidene chlorofluoride. It will be noted from the specific examples which follow, that neither styrene, methyl methacrylate, nor vinyl acetate alone would undergo thermal polymerization initiation with a benzoxazolyl disulfide. However, this does not prevent their copolymerization with acrylonitrile or methacrylonitrile under the thermal initiating influence of benzoxazolyl disulfides.

The following examples illustrate some preferred aspects of the invention but are not to be taken as exhaustive of the broad scope thereof.

*Examples*

In a series of tests, a given monomer in the amount of 20 ml. and 0.02 gram of 2,2'-bis-benzoxazolyl disulfide were sealed under nitrogen in a Pyrex tube and heated at 95° C. for a period of time which was varied with the different monomers in accordance with previous experience indicating a desirable time for tests of this nature. The tubes were protected from light. A blank containing only the monomer in the amount of 20 ml. with no added 2,2'-bis-benzoxazolyl disulfide was also prepared in the same manner and subjected to the same conditions. After the chosen polymerization period each tube was opened, the weighed contents precipitated in excess methanol, filtered, washed with methanol, dried, and weighed again, to determine thereby the weight percent of monomer charged that had been converted to polymer. The specific viscosities of the polymers were determined on a 0.1 weight percent polymer solution in dimethylformamide for polyacrylonitrile and in acetone for polymethacrylonitrile.

It can be pointed out that higher conversions can be obtained with longer reaction times and/or larger quantities of initiator.

Results of the various tests are given in the following table:

| Monomer | Time, Hrs. | Conversion, Weight, Percent | | Specific Viscosity of Polymer | |
|---|---|---|---|---|---|
| | | Catalyzed | Blank | Catalyzed | Blank |
| Acrylonitrile | 17 | 20 | 0 | 0.50 | |
| Methacrylonitrile | 30 | 15 | 10 | 0.35 | 0.35 |
| Styrene | 7 | 16 | 16 | 0.10 | 0.19 |
| Methyl methacrylate | 2½ | 8 | 9.6 | 0.17 | 0.32 |
| Vinyl acetate | 45 | 0 | 0 | | |

From the foregoing data it is clear that 2,2'-bis-benzoxazolyl disulfide is not an initiator for the thermal polymerization of vinyl acetate, methyl methacrylate, or styrene. On the other hand, the benzoxazolyl disulfide compound definitely increased the polymerization rate of methacrylonitrile, and made possible the polymerization of acrylonitrile at conditions which, in the absence of the added compound, produced no polymerization whatsoever.

While the invention has been described herein with particular reference to various preferred embodiments thereof, and examples have been given of suitable proportions and conditions, it will be appreciated that variations from the details given herein can be effected without departing from the invention.

I claim:

1. A polymerization process which comprises heating a monomer consisting of a compound selected from the group consisting of acrylonitrile and methacrylonitrile in the presence of, as the sole polymerization catalyst, small but catalytic amounts of a benzoxazolyl disulfide compound effective to increase the rate of polymerization of said monomer.

2. A process according to claim 1 wherein said benzoxazolyl disulfide compound is employed in an amount within the range of 0.01 to 0.1 weight percent of the monomer.

3. A process according to claim 1 wherein said heating is effected at a temperature above 50° C.

4. A process according to claim 1 wherein said polymerization is effected in mass.

5. A process according to claim 1 wherein said benzoxazolyl disulfide compound is 2,2'-bis-benzoxazolyl disulfide.

6. A polymerization process which comprises heating a monomer consisting of acrylonitrile in the presence of, as the sole polymerization catalyst, small but catalytic amounts of a benzoxazolyl disulfide compound effective to increase the rate of polymerization of said acrylonitrile.

7. A polymerization process which comprises heating a monomer consisting of methacrylonitrile in the presence of, as the sole polymerization catalyst, small but catalytic amounts of a benzoxazolyl disulfide compound effective to increase the rate of polymerization of said methacrylonitrile.

References Cited in the file of this patent

UNITED STATES PATENTS

| | | |
|---|---|---|
| 2,376,338 | Browning | May 22, 1945 |
| 2,380,426 | Fryling | July 31, 1945 |
| 2,380,471 | Semon | July 31, 1945 |
| 2,388,515 | Zwicker et al. | Nov. 6, 1945 |
| 2,754,290 | Kern | July 10, 1956 |